March 19, 1968

H. H. SHAW 3,374,036

RETRACTABLE CLEAT

Filed May 17, 1966

INVENTOR.
HUGH H. SHAW
BY Naylor + Neal
ATTORNEYS

United States Patent Office 3,374,036
Patented Mar. 19, 1968

3,374,036
RETRACTABLE CLEAT
Hugh H. Shaw, Salinas, Calif., assignor to Domino
Sugar Company, a corporation of Delaware
Filed May 17, 1966, Ser. No. 550,808
2 Claims. (Cl. 305—13)

ABSTRACT OF THE DISCLOSURE

A retractable cleat for track laying vehicles having a resilient cushion and support portion for attachment at the marginal edges of the vehicle tracks and self cleaning features for cleaning snow and ice from the cleat during operation.

This invention relates to a track laying vehicle for transporting men and equipment over snow, swamps, and other surfaces having a loose composition. More particularly, the invention relates to an improved propulsion mechanism for such a vehicle.

It is often desirable in the operation of track laying vehicles to have propulsion mechanisms which can operate both on loose and hard surfaces, e.g. on both snow and concrete. One means by which such a propulsion mechanism may be obtained is by having retractable cleats. These cleats are withdrawn when the track laying vehicle operates on a hard surface. Conversely, the cleats are extended when the vehicle travels over a loose surface. The basic concept of retractable cleats is old in the art as illustrated by Patee, Patent No. 3,063,401 and Stewart, Patent No. 2,599,592. The present invention discloses an improved form of a propulsion mechanism utilizing retractable cleats for a track laying vehicle.

Previous forms of propulsion mechanisms provide no means by which the cleats can be automatically cleaned between uses. As a result, the gripping sufficiency of the cleats is impaired. Applicant's invention solves this problem by automatically removing any loose foreign matter collected on the cleats.

Previous forms of propulsion mechanisms using retractable cleats permitted foreign matter to be accumulated between the cleats and the endless track. This resulted either in incomplete extension of the cleat or wear between the cleat and the endless track. Applicant's invention solves this problem by using the cleat to force the foreign matter out from between the cleat and the endless track.

Previous forms of propulsion mechanisms using retractable cleats are either of one of two types. One type has the retractable cleats permanently mounted on the endless track. The other type permits the removal of the retractable cleats, but requires an excessive amount of time and effort to make the change. Applicant's invention permits the easy application of retractable cleats to the conventional type track laying vehicle.

Other advantages of the invention will become apparent from the following description read in conjunction with the attached drawings in which.

Figure 1:
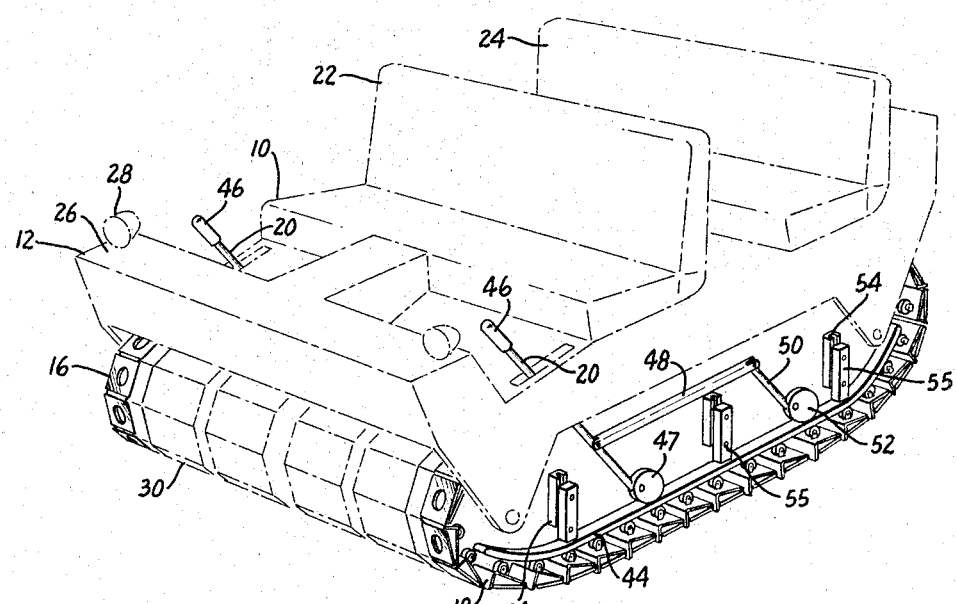
FIG. 1 is a perspective view illustrating one form of the invention as incorporated into a track laying vehicle.

Referrring now in detail to FIG. 1, an endless track vehicle is indicated in general by numeral 10. The vehicle 10 is composed of a load carrying body 12, a power means (not shown) located within the body 12, and conventional power control means (not shown) for driving a rotatably mounted endless track 16 disposed beneath the body 12 to support and move the body 12. Retractable cleats 18 having blades 19 are movably mounted along the outside edges of the endless track 16, and actuator means 20 mounted on each side of the body 12 for depressing the cleats 18 into a ground gripping position.

The load carrying body 12 has appropriate seating facilities, seats 22 and 24, for an operator and passengers on the rearward portion of the body. In the forward portion of the body 12 an elevated portion 26 provides space for conventional power control means. Also mounted on the elevated portion 26 are illuminating lamps 28 for use when the vehicle 10 is used under dark conditions.

Figure 2:
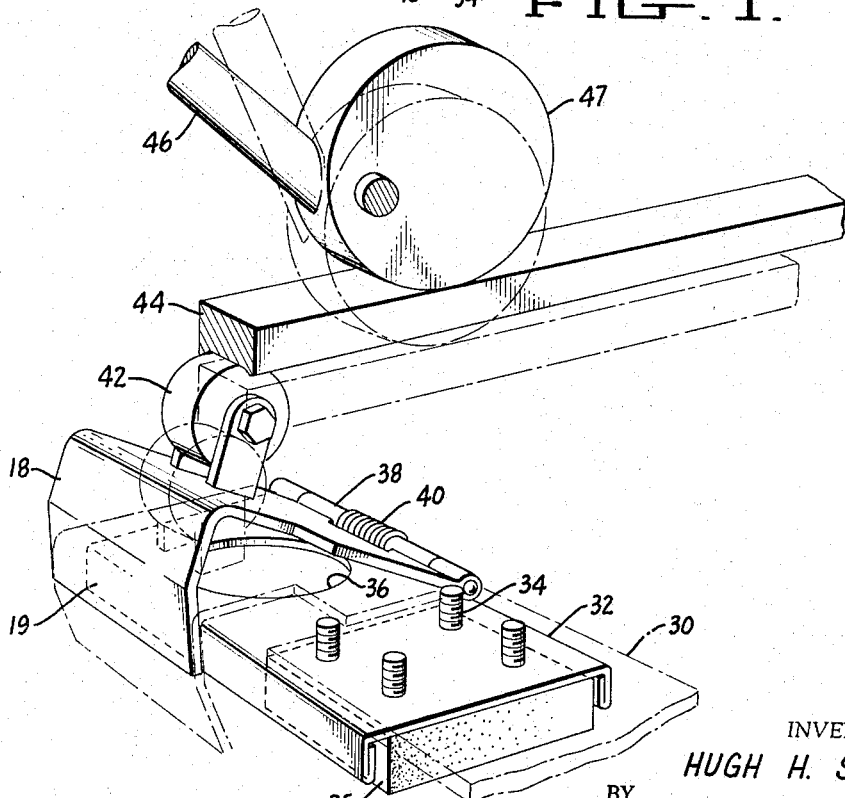
FIG. 2 is a perspective view in detail of a retractable cleat and cam combination taken from the left side of FIG. 1.

The endless track 16 is located beneath the body 12 and is composed of a plurality of conventional track plates 30 and detachable track plates 32. Each detachable plate 32 (see: FIG. 2) is bolted to a track plate 30, shown in phantom in FIG. 2, by bolts 34. The plate 32 has mounted at one end thereof and below the bolts 34 a resilient pad 35 upon which the vehicle normally rides when the plate 32 is attached. This permits the vehicle 10 to be driven on hard surfaces such as concrete or asphalt roads. At the opposite end from the resilient pad 34 the plate 32 has an opening 36.

The cleat 18 is mounted on the trailing edge of the plate 32 by a hinge 38. A spring 40 biases the cleat 18 upwardly away from the plate 32 to a retracted position illustrated in full line in FIG. 2. Mounted on the top of the cleat 18 is a roller 42 which is biased by the spring 40 against a camming contour member 44. Thus, in its retracted position, shown in heavy lines in FIG. 2, the cleat 18 does not extend below the plate 32. However, when the camming contour member 44 is moved down as shown in phantom, the cleat 18 is forced down below the plate 32 (also shown in phantom). Downward movement of the cleat 18 also has the effect of forcing any foreign matter accumulated on the inside of the cleat 18 and above the plate 32 out through the opening 36.

The camming contour member 44 is part of the actuator means 20 and its relative position is dependent upon the position of a handle 46. The handle 46 is connected directly to a cam 47 which rides on the top of the camming contour member 44. A cross link 48 ties the handle 46 to a shortened handle 50. The handle 50 is connected directly to a cam 52 which rides on the top of the camming contour member 44 near the rear of the vehicle. Thus, when handle 46 is moved from the withdrawn position as shown in FIG. 1 into the drawn position, the cams 47 and 48 cooperate to force the cam contour member 44 downward, as illustrated in phantom in FIG. 2. Guides 54 are located along the sides of the body 12 and ride inside the guides 55 mounted on the camming contour member 44 to insure that the camming contour member 44 does not become skewed. When the handle 46 is in its drawn position, the cleats 18 are extended and withdrawn once for each revolution of the track. As the cleat is withdrawn, snow and other loose material is scraped off the cleat by the plate 32, and as the cleat is extended, snow accumulated between the cleat and the plate 32 is expelled through the hole 36.

It should be noted that while the actuator means 20 has been discussed with respect to one side of the vehicle 10, the same arrangement is also present on the other side of the vehicle 10.

While one embodiment of the invention has been illustrated and described in detail herein, many modifications thereof may be made without departing from the spirit and scope of the invention.

What is claimed is:
1. A cleat attachment for a track laying vehicle adapted to be attached to the tracks of said vehicle along the lateral edges of said tracks which comprises:
(A) a rigid plate member having first and second faces,

(B) a cleat pivotally mounted on said plate member at a hinge axis adjacent to one side of said plate member with said cleat extending from said hinge axis over said first face of said plate member and terminating in a blade which extends through the plane of said plate member past said second face thereof, (C) means for moving said cleat about said pivotal axis to retract said blade to the first face side of said plate member, (D) said cleat having a width measured parallel to said axis which is substantially less than the width of said plate measured parallel to said axis whereby said plate has a cleat portion covered by said cleat and a support portion laterally spaced from said cleat portion, (E) connecting means in said support portion of said plate member for attaching said plate member to the track of a track laying vehicle at the marginal edge of said track, and a resilient pad mounted on said support portion of said plate member on the second face of said plate member.

2. The cleat attachment of claim 1 characterized further by the inclusion of an aperture in said cleat portion of said plate member between said hinge axis and said blade whereby snow under said cleat may pass through said plate portion.

References Cited

UNITED STATES PATENTS

| | | | |
|---|---|---|---|
| 1,730,059 | 10/1929 | Carvin | 305—13 |
| 2,599,592 | 6/1952 | Stewart | 305—10 |
| 3,058,783 | 10/1962 | Wadsworth | 305—51 |
| 3,063,401 | 11/1962 | Patee | 115—1 |

FOREIGN PATENTS

| | | |
|---|---|---|
| 536,780 | 5/1941 | Great Britain. |
| 221,138 | 8/1942 | Switzerland. |

RICHARD J. JOHNSON, *Primary Examiner.*